Aug. 11, 1925.
P. F. VOKAL ET AL
1,549,634
CUTTING TOOL
Filed April 7, 1922
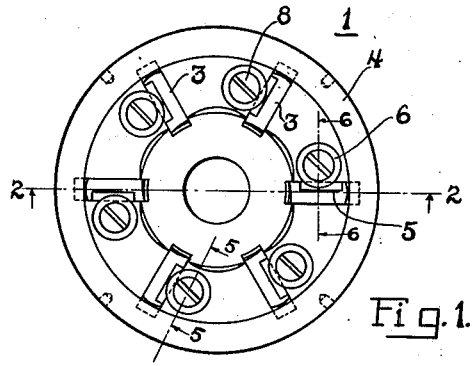
Fig.1.
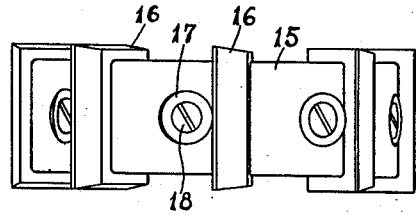
Fig.3.
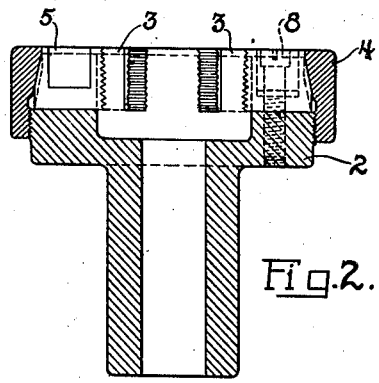
Fig.2.
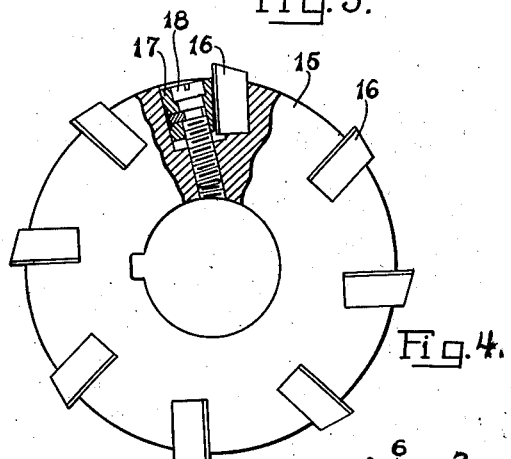
Fig.4.
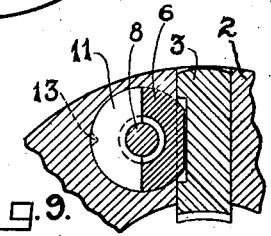
Fig.9.
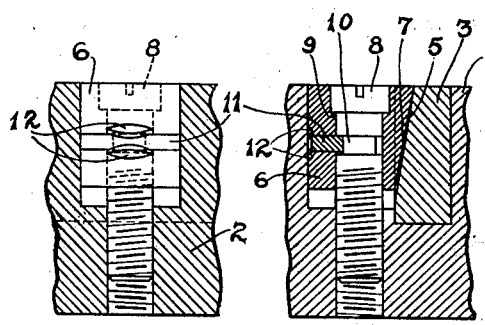
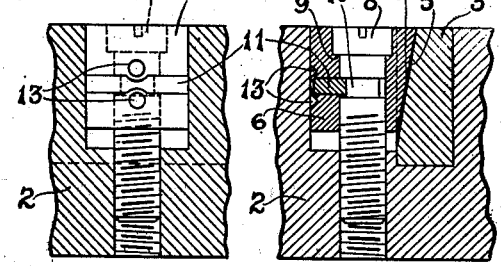
Fig.5.  Fig.6.  Fig.7.  Fig.8.
Inventor
P. F. Vokal
Carl Schramm
By Wayne B Wells
Attorney Patented Aug. 11, 1925.

1,549,634

UNITED STATES PATENT OFFICE.

PAUL F. VOKAL, OF HARTFORD, AND CARL SCHRAMM, OF WEST HARTFORD, CONNECTICUT, ASSIGNORS TO PRATT & WHITNEY COMPANY, OF NEW YORK, N. Y., A CORPORATION OF NEW JERSEY.

CUTTING TOOL.

Application filed April 7, 1922. Serial No. 550,323.

*To all whom it may concern:*

Be it known that we, PAUL F. VOKAL and CARL SCHRAMM, citizens of the United States, residing at Hartford and West Hartford, respectively, in the county of Hartford and State of Connecticut, have invented certain new and useful Improvements in a Cutting Tool, of which the following is a specification.

Our invention relates to cutting tools having removable cutting members and particularly to dies for cutting threads.

One object of our invention is to provide a cutting tool having adjustable cutting members and wedging members for holding the cutting members in set position that shall be provided with improved means for effecting a simple and a quick adjustment or removal of the wedge members.

We have illustrated our invention as being applied to a milling cutter having detachable teeth and also to a die having removable chaser members. In a die constructed in accordance with our invention, the chaser members are fitted to slots in a body member in the usual manner and are jointly adjusted by means of an adjusting ring. The ring is attached to the body member and engages all the chaser members. A wedging member is fitted to the body portion of the die adjacent each chaser member and a tapered portion is formed on each wedge member for engaging a tapered portion of the associated chaser member. The taper on the wedging member differs somewhat from the taper on the chaser member in order to effect a maximum wedging action between the wedge member and the chaser member near the top of the wedge member. Screw members, which project through each wedge member, serve not only to secure the wedge members to the body portion of the die but also to effect a wedging action between the wedge member and the associated chaser member. Preferably the head of the screw member engages the wedge member for forcing it towards the body member but if so desired a separate shoulder may be formed on the screw member for such purpose. A semi-circular washer projects through a slot in each wedge member into a groove formed on the screw member. The washer member is preferably held in position in the wedge member by means of center punch marks made in the wedge member adjacent the washer member. The groove in the screw member is preferably somewhat wider than the thickness of the washer member in order to permit a limited axial movement of the screw member relative to the wedge member. It is apparent the washer member serves to effect a withdrawal of the wedge member from engagement with the chaser member when the screw member is removed from the body member.

In the accompanying drawing:

Figure 1 is a plan view of a die constructed in accordance with our invention.

Fig. 2 is a sectional elevational view along the line 2—2 of the die shown in Fig. 1.

Fig. 3 is a plan view of a milling cutter constructed in accordance with our invention.

Fig. 4 is an end view partially in section of the milling cutter shown in Fig. 3.

Fig. 5 is a sectional view taken along the line 5—5 of Fig. 1 and showing one means of holding the washer members in position.

Fig. 6 is a sectional view taken along the line 6—6 of Fig. 1.

Figs. 7, 8 and 9 are respectively, front, side and plan views of a second means for holding the washer members in position.

Referring to Figs. 1 and 2 of the drawing, a thread die 1 is shown comprising a body member 2 and six chaser members 3. The chaser members are fitted to slots formed in the body member in the customary and usual manner. The ends of the chaser members are tapered and are engaged by an adjusting ring 4. The adjusting ring 4 is threadably connected to the body portion 2 of the die and in accordance with the usual practice serves to simultaneously adjust the position of all the chaser members. Each of the chaser members has a tapered portion 5 for a purpose to be hereinafter set forth. The tapered portion on the chaser members is best shown in Figs. 1, 6 and 8 of the drawing.

A wedge member 6 is fitted to the body member 2 adjacent each chaser member. Each wedge member is preferably cylindrical in form and has a tapered portion 7 which engages the tapered portion 5 on the chaser member, as best shown in Figs. 6 and 8 of the drawing. Preferably, a different taper is formed on the wedge member in order to obtain a maximum wedging action between the wedge member and the chaser member near the top of the wedge member. A screw member 8, which is threadably connected to the body member 2, projects through the wedge member and preferably the head thereon engages a shoulder 9 formed on the wedge member, as shown in Figs. 6 and 8 of the drawing. A groove 10 is formed in the screw member for a purpose to be hereinafter set forth. It is apparent the turning of the screw member 8 serves to force the wedge member 6 into engagement with the adjacent chaser member for holding the latter in any set position.

In the cutting tools of the above indicated type as constructed according to the modern practice, trouble is experienced in removing the wedge members when it is desired either to replace or adjust the chaser members. In order to effect a ready removal of the wedge members at any time, a semicircular washer member 11 is projected through the wedge member into the groove 10 formed in the screw 8, as shown in Figs. 6 and 8 of the drawing. Preferably the width of the groove 10 is somewhat greater than the thickness of the washer member 11 in order to permit a limited axial movement of the screw 8 before the wedge member is caused to move therewith. If the groove 10 in the screw were not wider than the washer member 11, it would be difficult to effect direct engagement between the screw and the wedge member when forcing the wedge member into position. In this construction, it is apparent the withdrawing or loosening of the screw 8 compels the wedge member to follow its axial movement and therefore to become disengaged from the adjacent chaser member.

In Figs. 5 and 6 of the drawing the washer member 11 is shown held in position in the wedge member by means of chisel marks 12 which are formed in the wedge member. In Figs. 7, 8 and 9 of the drawing the washer member is shown held in position in the similar manner by means of center punch marks 13.

Referring to Figs. 3 and 4 of the drawing, our invention is shown applied to a milling cutter having removable teeth. The milling cutter comprises a body portion 15 having a plurality of teeth 16 fitted to slots formed in the body member. A wedge member 17, similar in construction and operation to the wedge member 6 shown in Figs. 1 and 2 of the drawing, is fitted to the body portion 15 adjacent each tooth 16. A screw member 18 projects through each wedge member 17 for not only holding the teeth securely in position but also for effecting ready removal of the wedge members when it is desired either to renew or adjust the chaser members. Preferably the taper formed on the teeth and the taper formed on the wedge member differ in the milling cutter shown in Figs. 3 and 4 in order to effect a maximum wedging action between the wedge member and the teeth near the top of the wedge member.

It will be understood that such changes and modifications may be made within our invention as fall within the limits of the appended claims.

What we claim is:

1. In a cutting tool, the combination comprising a plurality of cutting members, a plurality of wedge members for holding the cutting members in set position, screw members for holding the wedge members in set position, and a semi-circular washer projecting through a portion of each wedge member for engaging a groove in the associated screw member to effect movement of the wedge members in accordance with the axial movement of the screw members.

2. In a cutting tool, the combination comprising a body member, a cutting member fitted to the body member, a holding member associated with the cutting member, a fastening member for securing the holding member to the body member and for holding the cutting member in set position, and means comprising a semi-circular washer member projecting through a portion of the holding member and engaging a recessed portion of the fastening member to compel movement of the holding member in accordance with certain movements of the fastening member.

3. In a cutting tool, the combination comprising a fastening member having a groove formed therein, a holding member associated with said fastening member, a cutting member held in set position by said holding member, and a washer member projecting through a wall of the holding member into the groove in the fastening member for compelling movement of the holding member upon axial movement of the fastening member, said groove being wider than the thickness of the washer member in order to permit a limited axial movement of the fastening member before moving the holding member.

4. In a cutting tool, the combination comprising a body member, cutting members fitted to slots formed in the body member, a portion of the side of each cutting member being tapered, a wedge member fitted to the body member adjacent to each cutting member and having a tapered portion engaging the tapered portion of the cutting member, a screw fitted to each wedge member and attached to the body member for forcing the wedge member against the cutting member to hold the latter in set position, and a member inserted through a wall of each wedge member and fitted to a groove formed on the associated screw of greater width than the thickness of the inserted member, whereby the wedge member is released from engagement with the cutting member upon release of the screw and whereby said screw may have limited free movement relative to said wedge member.

5. In a cutting tool, the combination comprising a body member, cutting members fitted to slots formed in the body member, a portion of the side of each cutting member being tapered, a wedge member fitted to the body member adjacent to each cutting member and having a tapered portion engaging the tapered portion of the cutting member, the taper on the wedge member differing from the taper on the cutting member so that the maximum wedging action will take place near the top of the wedge member, a screw fitted to each wedge member and attached to the body member for forcing the wedge member against the cutting member to hold the latter in set position, and a semi-circular washer inserted in a slot in the wedge member and projecting into a groove formed on the screw member, whereby the wedge member is released from engagement with the cutting member upon withdrawal of the screw member.

6. In a thread die, the combination comprising a body member, a plurality of chaser members fitted to slots formed in the body member, a portion on the side of each chaser member being tapered, a wedge member fitted to the body member adjacent to each chaser member and having a tapered portion engaging the tapered portion of the chaser member, a screw member fitted to each wedge member and atached to the body member for forcing the wedge member against the chaser member to hold the latter in set position, an adjusting ring attached to the body member and engaging the chaser members for adjusting them simultaneously to any set position, and a washer member projecting through each wedge member into a groove formed on the associated screw member, the groove on the screw member being somewhat wider than the thickness of the washer member in order to permit a limited axial movement of the screw member before moving the wedge member.

In testimony whereof, we hereto affix our signatures.

PAUL F. VOKAL.
CARL SCHRAMM.